(12) United States Patent
Sarachik

(10) Patent No.: US 6,459,820 B1
(45) Date of Patent: Oct. 1, 2002

(54) GAUGING USING SUB-MODEL POSES

(75) Inventor: Karen B. Sarachik, Newton, MA (US)

(73) Assignee: Cognex Corporation, Natick, MA (US)

( * ) Notice: Subject to any disclaimer, the term of this patent is extended or adjusted under 35 U.S.C. 154(b) by 0 days.

(21) Appl. No.: 09/140,124

(22) Filed: Aug. 25, 1998

(51) Int. Cl.[7] .................................................. G06K 9/36
(52) U.S. Cl. ...................................... 382/286; 382/141
(58) Field of Search ................................ 382/286, 293, 382/298, 143, 145, 141, 86, 95; 702/158, 155

(56) References Cited

U.S. PATENT DOCUMENTS

| | | |
|---|---|---|
| 4,980,971 A | 1/1991 | Bartschat et al. |
| 5,060,276 A | 10/1991 | Morris e tal. ................... 382/8 |
| 5,113,565 A | 5/1992 | Cipolla et al. |
| 5,226,095 A | 7/1993 | Okumura et al. ............. 382/48 |
| 5,268,999 A | 12/1993 | Yokoyama |
| 5,343,028 A | 8/1994 | Figarella et al. |
| 5,371,690 A | 12/1994 | Engel et al. |
| 5,471,541 A | 11/1995 | Burtnyk et al. ............. 382/153 |
| 5,495,537 A | 2/1996 | Bedrosian et al. |
| 5,497,451 A | 3/1996 | Holmes |
| 5,500,906 A * | 3/1996 | Picard et al. ................ 382/220 |
| 5,545,887 A | 8/1996 | Smith et al. |
| 5,602,937 A | 2/1997 | Bedrosian et al. .......... 382/151 |
| 5,621,807 A * | 4/1997 | Eibert et al. ................. 382/103 |
| 5,625,715 A | 4/1997 | Trew et al. .................. 382/236 |
| 5,627,912 A | 5/1997 | Matsumoto |
| 5,627,915 A | 5/1997 | Rosser et al. ............... 382/219 |
| 5,663,809 A * | 9/1997 | Miyaza et al. .............. 382/298 |
| 5,828,769 A * | 10/1998 | Burns .......................... 382/118 |
| 5,845,288 A | 12/1998 | Syeda-Mahmood ......... 707/102 |
| 5,850,469 A | 12/1998 | Matrin et al. ................ 382/154 |
| 5,974,169 A * | 10/1999 | Backelder .................... 382/286 |

OTHER PUBLICATIONS deFigueiredo et al "Model Based Orientation Independent 3–D Machine Vision Techniques", IEEE Transactions on Aerospace and Electronic Systems, vol. 24, No. 5 Sep. 1988, pp. 597–607.*

Hoogs et al., "Model–Based Learning of Segmentations", IEEE, pp. 494–499, 1996.

Newman et al., "3D CAD–Based Inspection I: Coarse Verification", IEEE, pp. 49–52, 1992.

Ullman, Shimon, "Aligning pictorial descriptions: An approach to object recognition, I: Approaches to Object Recognition," reprinted from Cognition Aug. 1989, pp. 201–214, vol. 32, No. 3, Cambridge, MA, USA.

Medina–Mora, Raul, "An Incremental Programming Environment," IEEE Transactions on Software Engineering, Sep. 1981, pp. 472–482, vol. SE–7, No. 5, USA.

* cited by examiner

*Primary Examiner*—Yon J. Couso
(74) *Attorney, Agent, or Firm*—Russ Weinzimmer

(57) ABSTRACT

A method is provided for measuring distances between locations in an image. The method includes finding a position of a full model using sub-models to find a plurality of locations in an image, then labeling the locations and determining distances using the labels. The method improves upon conventional gauging techniques by exploiting information typically provided by a sub-model based shape finder so as to eliminate one or more computationally intensive applications of one or more vision tools. More specifically, the features of the found instance of the model that are used as a basis for performing measurements are those features that have already been accurately located by the sub-model based shape finder.

11 Claims, 6 Drawing Sheets

| Submodel Label | Position |
| --- | --- |
| 1 | (x1,y1) |
| 2 | (x2,y2) |
| 3 | (x3, y3) |
| 4 | (x4,y4) |
| ⋮ | ⋮ |
| ⋮ | ⋮ |
| ⋮ | ⋮ |
| n | (xn, yn) |

| Defined Range (nom, min, max) | Scale Type | X | Scale of Model Pose | = | Scaled Range (nom, min, max) |
|---|---|---|---|---|---|
| (100, 90, 105) | Fixed | | 200% | | (100, 90, 105) |
| (100, 90, 105) | Scale Nominal | | 200% | | (200, 190, 205) |
| (100, 90, 105) | Scale All | | 200% | | (200, 180, 210) |
| (100, 90, unbound) | Scale All | | 200% | | (200, 180, unbounded) |

Figure 4

| Measurement | Angle | Tolerance | Submodel Pairs |
|---|---|---|---|
| 1<br>(y-thickness) | none | (20, 15, 25, fixed) | 7, 6<br>8, 5<br>11, 2<br>12, 1 |
| 2<br>(x-thickness) | none | (20, 15, 25, fixed) | 9,10<br>8,11<br>5,2<br>4,3 |
| 3<br>(height) | none | (60, 45, 75, fixed) | 9,4<br>10,3 |
| 4<br>(width) | none | (60, 45, 75, fixed) | 7,12<br>6,1 |

| Measurement | Angle | Tolerance | Submodel Pairs |
|---|---|---|---|
| 1 | none | (50, 50, unbounded, fixed) | (1, 2) |
| 2 | none | (50, 50, unbounded, fixed) | (1, 4) |
| 3 | none | (50, 50, unbounded, fixed) | (2, 3) |
| 4 | none | (50, 50, unbounded, fixed) | (2, 5) |
| 5 | none | (50, 50, unbounded, fixed) | (3, 6) |
| 6 | none | (50, 50, unbounded, fixed) | (4, 5) |
| 7 | none | (50, 50, unbounded, fixed) | (4, 7) |
| 8 | none | (50, 50, unbounded, fixed) | (5, 6) |
| 9 | none | (50, 50, unbounded, fixed) | (5, 8) |
| 10 | none | (50, 50, unbounded, fixed) | (6, 9) |
| 11 | none | (50, 50, unbounded, fixed) | (7, 8) |
| 12 | none | (50, 50, unbounded, fixed) | (8, 9) |

GAUGING USING SUB-MODEL POSES

FIELD OF THE INVENTION

This invention relates to machine vision, and particularly to methods for gauging and otherwise determining distances within an image.

BACKGROUND OF THE INVENTION

In model-based recognition, there is a need to not only find an instance of a model in an image, but also to sometimes measure one or several attributes of the instance of the model in the image to verify that the instance of the model in the image is within a predetermined tolerance. This measurement is most commonly accomplished by applying one or more vision tools to the image, after an instance of the model has been located, so as to determine distances between selected points within the instance of the model in the image. For example, a common way to determine distances between selected points within the instance of the model in the image is to first find an instance of a model in the image, and then to specify absolute locations within the model which some other vision tool (such as a caliper) can then use to measure (also called "to gauge") some particular distance between two selected points, i.e., some "dimension", of the model.

The reason that an extra vision tool application is almost always required for such a gauging step is that the most powerful pattern matching techniques known in the art can locate an instance of a model in an image up to a linear deformation (such as uniform rotation or scaling), but cannot detect regular nonlinear deformations between the model and the image. An example is shown in FIG. 1, wherein a cross 10 can be detected as having a linear scale change into a scaled cross 12, but the shortening effect evident in the shortened scaled cross 14 cannot be detected, and consequently the shortened scaled cross 14 is usually erroneously interpreted as missing an edge.

SUMMARY OF THE INVENTION

A method is provided for measuring distances between locations in an image. The method includes using sub-models to find a plurality of locations in an image, then labeling the locations and determining distances using the labels. In a preferred embodiment, the method further includes performing a projection of a distance along a direction so as to provide a projected distance. In a further preferred embodiment, the projected distance is either a length, a width, a depth, a height, a thickness, or a size.

In other preferred embodiments, using sub-models includes finding a position of a full model in the image using sub-models.

In yet other preferred embodiments, the found distances are evaluated, either with respect to a tolerance, or other range or threshold. In further preferred embodiments, the tolerance is transformable.

In alternate preferred embodiments, determining distances using the labels includes identifying pairs of locations, and in further preferred embodiments, then identifying groups of pairs of locations. It is also preferred to then compute an average distance using an identified group of pairs of locations.

The present invention can use the output of a sub-model based shape finder, such as the one described in the co-pending patent application Ser. No. 09/054,968, issued as U.S. Pat. No. 6,324,299, entitled "Object Image Search using Sub-Models," herein incorporated by reference.

The invention improves upon conventional gauging techniques by exploiting information typically provided by a sub-model based shape finder so as to eliminate one or more computationally intensive applications of one or more vision tools. More specifically, the features of the found instance of a model that are used as a basis for performing measurements are those features that have already been accurately located by the sub-model based shape finder.

The method of the invention is easily configurable, because the dimensions to be gauged are defined by specifying one or more pairs of sub-models along the relevant dimensions, and the minimum and maximum limits on the range of the measurement. Also, the feature-to-feature distance used for gauging can be specified as an absolute distance, or alternatively, as a projection along an angle. Lastly, the tolerance can be flexibly specified, for example, as an absolute quantity, as a percentage of nominal value, or any other way.

BRIEF DESCRIPTION OF THE DRAWING

The invention will be more fully understood from the following detailed description, in conjunction with the following figures, wherein:

FIG. 4 is a table illustrating tolerance scaling according to scale type;

DETAILED DESCRIPTION OF THE PREFERRED EMBODIMENTS

Figures 1, 3:
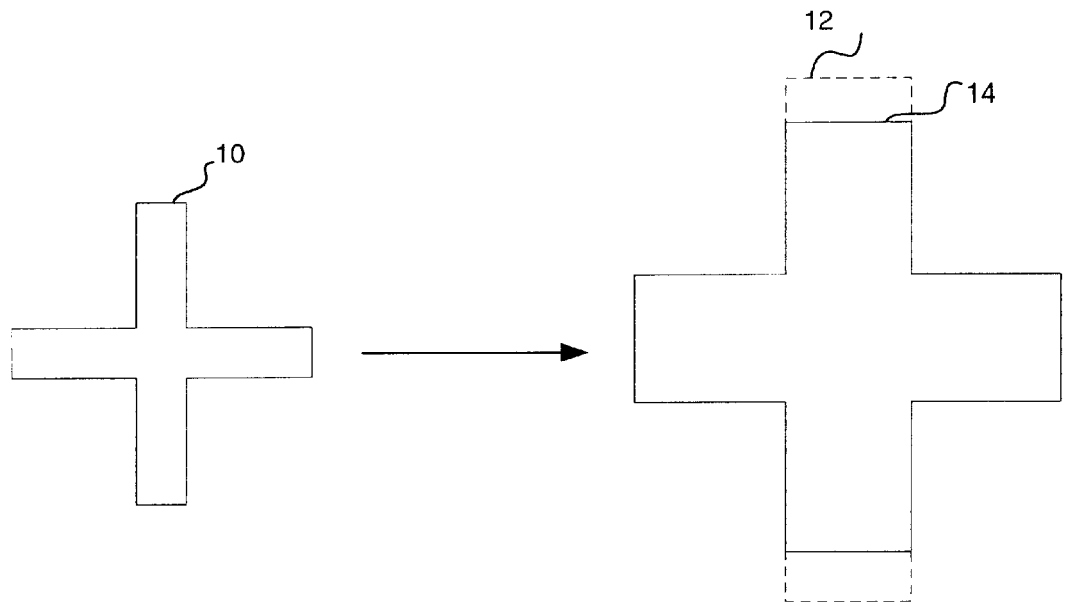
FIG. 1 is an illustration of a cross before (thin solid line) and after it has been scaled (dotted line) and shortened (dark solid line)
FIG. 3 is a table of the data output from the sub-model finder of FIG. 2.
Figure 2:
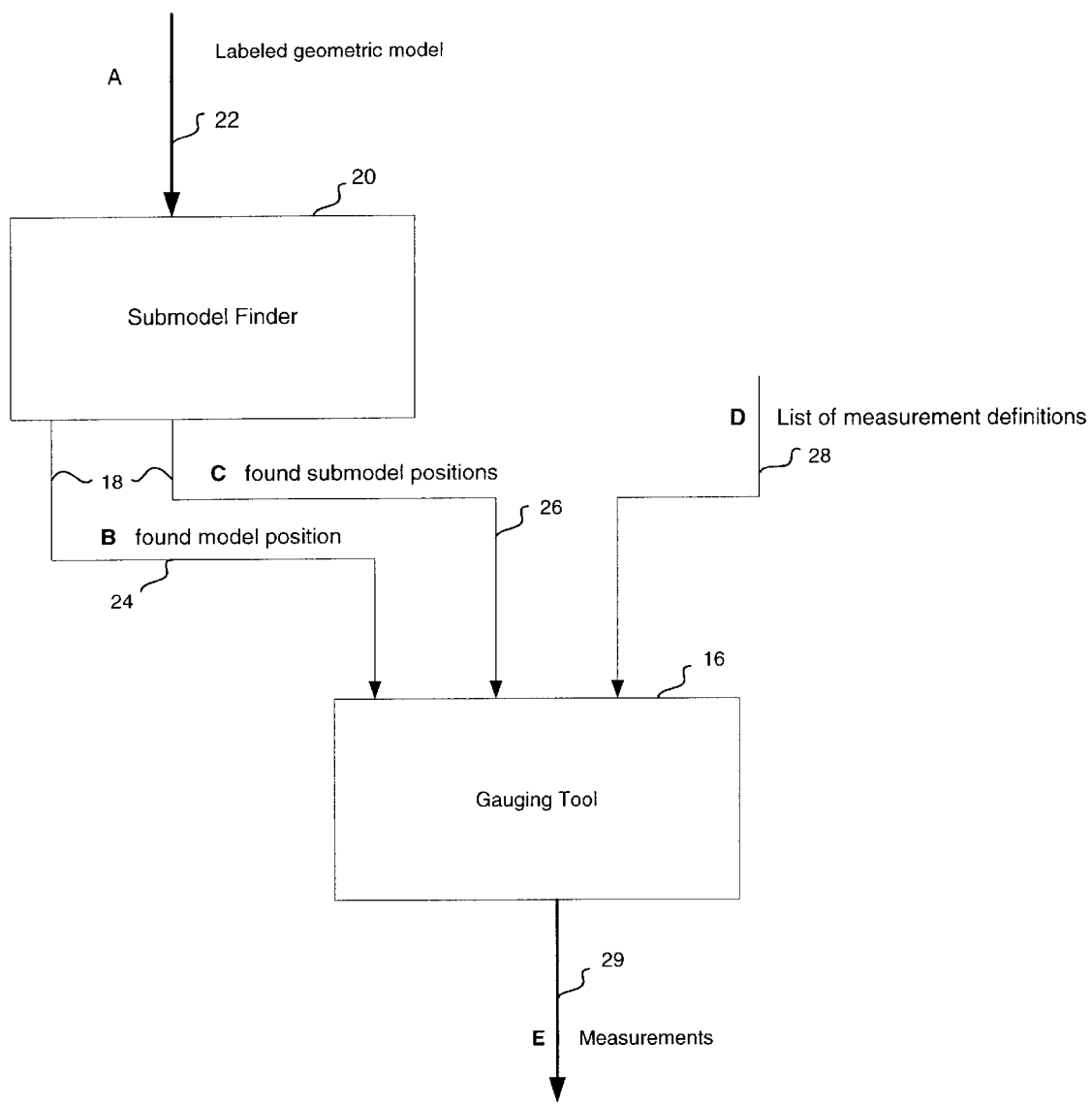
FIG. 2 is a top-level block diagram showing data inputs and output of the gauging tool of invention.

Referring to FIG. 2, the gauging tool 16 of the invention takes as input the output 18 of any sub-model based shape finder 20. The input 22 to the sub-model based shape finder 20 is a labeled geometric model A 22. The sub-model finder 20 breaks up a geometric model A into parts either automatically, or based on a user defined labeling scheme. Each part is referred to as a sub-model. The sub-model finder 20 roughly finds the entire model within the image, refines the positions of the sub-models within local image neighborhoods, and fits the refined locations of the sub-models to their positions within the model. The accuracy of the sub-model positions within the image is crucial to the success of the gauging technique of the invention. The information provided by this step is the model position in the image B 24, as well as the exact position in the image of each of the found sub-models C 26. The organization of the exact position in the image of each of the found sub-models 26 is shown in FIG. 3.

Figures 5A, 5B:
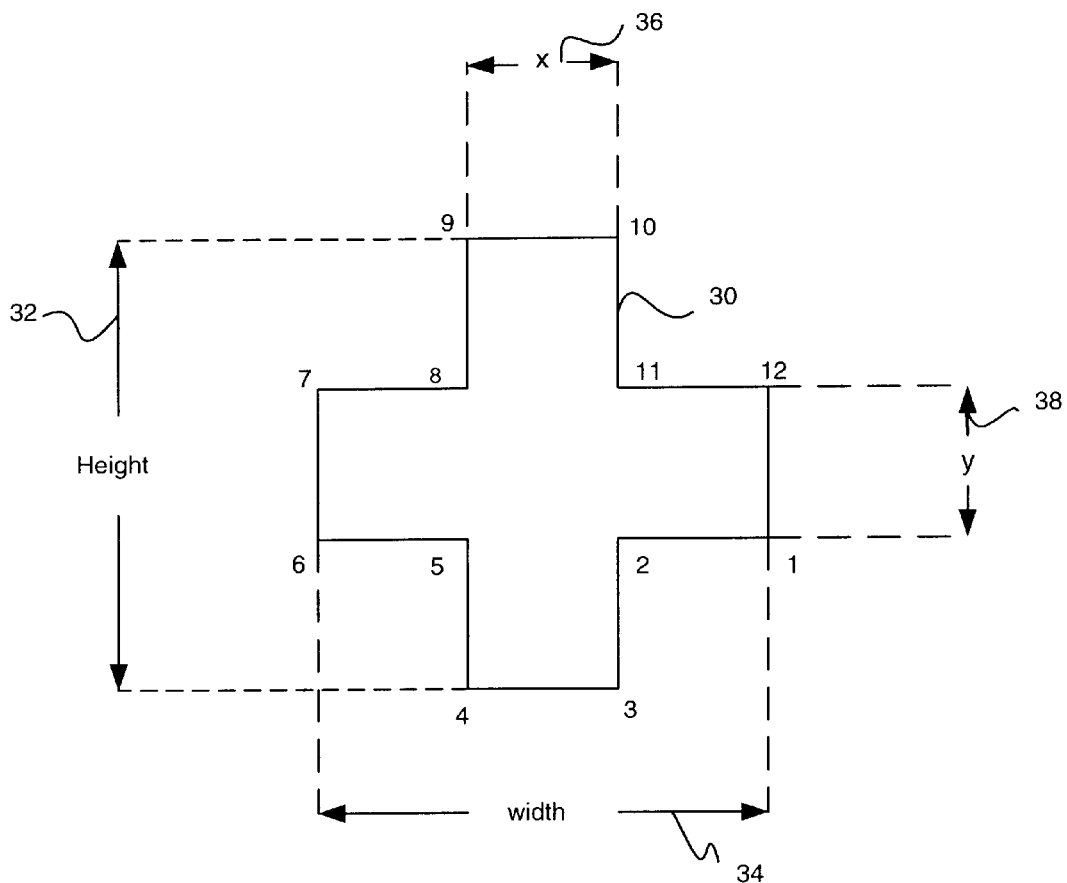
FIGS. 5A and 5B show an object to be gauged (a cross), its labeled sub-models, and a table of measurement definitions, and associated angle, tolerance and sub-model pairs that fall within the associated measurement definition.

The user provides at setup time a list of measurement definitions D 28. A measurement definition 28 consists of a list of one or more sub-model pairs to be used for gauging the measurement. Examples of a list of measurement definitions can be seen in FIGS. 5B and 6B. In FIG. 5B, for example, the height 32, width 34, x-thickness 36, and y-thickness 38 of a cross 30 can be gauged by choosing appropriate pairs of sub-models along its perimeter. Pairs of sub-models whose distance from each other reflect the underlying measurement desired to be made are grouped together under the same measurement definition, e.g., height or width. The desired distance measurement may be a physical attribute of an object such as width or height, but may also be anything else, e.g., a diagonal span.

Figures 6A, 6B:
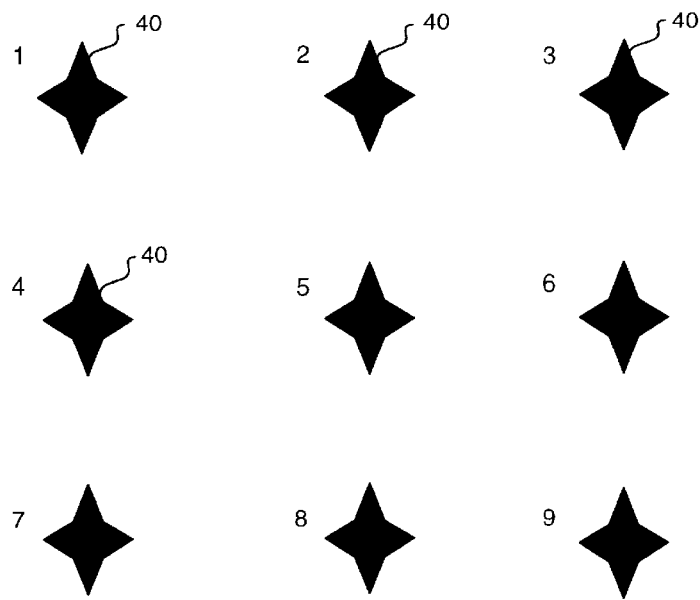
FIGS. 6A and 6B show an object to be gauged (an array of stars), its labeled sub-models, and a table of measurement definitions, and associated angle, tolerance and sub-model pairs that fall within the associated measurement definition.

Another example can be seen in FIG. 6A, in which the goal is to ensure that the found shapes 40 on a grid are not closer to each other than some specified distance. In this case, each shape 40 on the grid is labeled as a separate sub-model with a unique label, and each neighboring pair of shapes (e.g., 1, 2 and 1, 4) on the grid is defined as a separate measurement definition.

Figure 7:
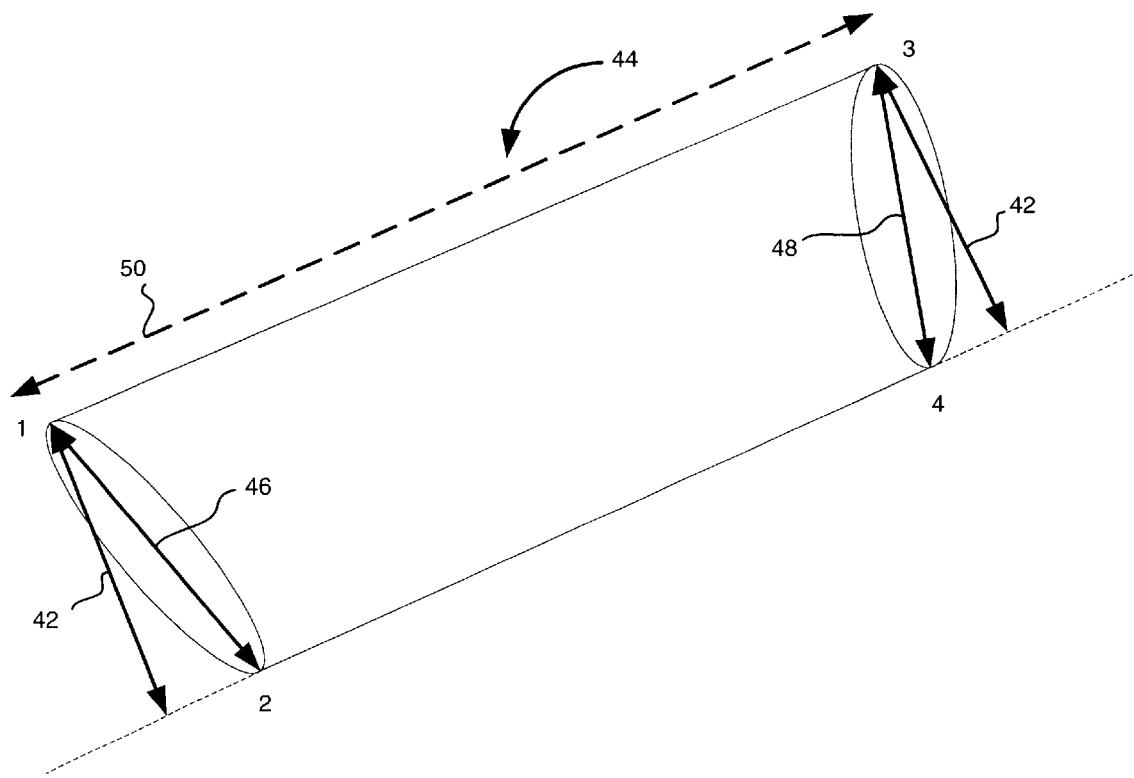
FIG. 7 is a representation of an object that is measured using an angle to obtain a projected distance that represents the desired measurement.

Referring to FIG. 7, the distance between sub-model pairs can be the measurement result, or a projection of the distance between sub-model pairs projected at an angle can be the result, where the angle is defined with respect to the found position of the entire geometric model. In the example of FIG. 7, the desired measurement is the width 42 of a cut tube 44. The entire tube 44 as well as the precise position of each of its ends has been located by the sub-model finder 20, but the width 42 of the tube 44 is given not by the distances 46 and 48 between sub-model pairs (1, 2) and (3, 4), respectively, but by their projection along the x-axis 50 of the found position of the tube 44. In other cases, an absolute distance, rather than a projection, may be more desirable.

Referring to FIG. 4, the measurement can be evaluated by using a scaleable tolerance, which flexibly defines the range of valid values of the measurement. A scaleable tolerance has a defined range including a nominal, minimum, and maximum value, as well as a scale type (either "Fixed", "Scale Nominal", or "Scale All"). For a Fixed scale type, the range values do not scale. For a "Scale Nominal" type, the nominal value changes, but the range around the nominal remains the same (that is, −10 units to +5 units around nominal). For a "Scale All" type, all three values change (i.e., the nominal as well as the range itself scales according to found model scale). The last example of FIG. 4 shows that scaling an unbounded value has no effect, i.e., the limit on the range remains unbounded. Additionally, either the minimum or maximum value may be unbounded, thus defining a range bounded on one side but not on the other. An example of this is the shapes on the grid of FIG. 6A, in which there is a bound on the minimum distance, but not on the maximum distance, as shown in the "Tolerance" column of the table. The bounds on the acceptable range for a measurement is given by the tolerance definition multiplied by the scale of the found full model pose. An example of each of the different tolerance scale types is shown in FIG. 4. If the measurement is found to be less than the minimum or greater than the maximum allowable value, it is considered to have failed tolerance.

Referring to FIG. 2, at run time, the gauging tool 16 of the invention receives as input the found model location B 24, the found sub-model locations C 26, and the measurement definition specification D 28. The gauging tool 16 computes for each sub-model pair the distance (if no angle is specified) or the projection along the specified angle. Finally, the average measurement value is computed for all the sub-model pairs of each measurement definition (e.g., width, height, etc.), and this value is output as the measurement result E 29, along with information as to whether the measurement result is within tolerance.

Other modifications and implementations will occur to those skilled in the art without departing from the spirit and the scope of the invention as claimed. Accordingly, the above description is not intended to limit the invention except as indicated in the following claims.

What is claimed is:

1. A method for measuring distances between locations in an image, the method comprising:

using a machine vision sub-model shape finder to find a plurality of locations in an image;

labeling the locations with respective labels; and determining distance between locations in the image using the labels.

2. The method of claim 1, further comprising: performing a projection of a distance using an angle so as to provide a projected distance.

3. The method of claim 2, wherein using sub-models includes finding a position of a full model in the image using sub-models, and wherein the projected distance is one of a length, a width, a depth, a height, a thickness, and a size.

4. The method of claim 1, wherein using sub-models includes:

providing a pose of a full model in the image using sub-models.

5. The method of claim 1, further comprising: evaluating the distances.

6. The method of claim 5, wherein evaluating the distances includes:

using a tolerance.

7. The method of claim 6, wherein the tolerance is scaled.

8. The method of claim 7, wherein using sub-models includes providing a pose of a full model in the image using sub-models, and wherein the tolerance is scaled using a scale of the full model pose.

9. The method of claim 1, wherein determining distances using the labels includes:

identifying pairs of locations.

10. The method of claim 9, further including:

identifying groups of pairs of locations.

11. The method of claim 10, further including:

computing an average distance using an identified group of pairs of locations.

* * * * *